United States Patent
Tsuchiya et al.

(10) Patent No.: US 7,732,005 B2
(45) Date of Patent: Jun. 8, 2010

(54) METHOD FOR PRODUCING RECORDING MEDIUM, RECORDING MEDIUM EMPLOYING SAID METHOD, AND INFORMATION RECORDING AND REPRODUCING APPARATUS

(75) Inventors: Yuko Tsuchiya, Tokorozawa (JP); Susumu Soeya, Tokyo (JP); Hiromasa Takahashi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 784 days.

(21) Appl. No.: 11/134,399

(22) Filed: May 23, 2005

(65) Prior Publication Data
US 2005/0266271 A1    Dec. 1, 2005

(30) Foreign Application Priority Data
May 25, 2004   (JP)   ............... 2004-155005

(51) Int. Cl.
B28B 3/00    (2006.01)
B05D 5/10    (2006.01)
G11B 5/71    (2006.01)
C03C 15/00   (2006.01)

(52) U.S. Cl. .................. 427/130; 427/129; 216/41; 428/836.3; 156/230

(58) Field of Classification Search .............. 216/39, 216/41, 42, 51, 83, 88; 428/692.1, 693.1, 428/831.2, 836.3, 842.1; 427/128, 129, 130; 360/135; 435/7.1, 235; 430/296; 156/230, 156/232, 239, 240, 249
See application file for complete search history.

(56) References Cited

U.S. PATENT DOCUMENTS

| | | | |
|---|---|---|---|
| 6,014,296 A | 1/2000 | Ichihara et al. | |
| 6,162,532 A * | 12/2000 | Black et al. | 428/842.1 |
| 6,719,841 B2 | 4/2004 | Chen et al. | |
| 6,841,224 B2 | 1/2005 | Kamata et al. | |
| 2002/0142192 A1 * | 10/2002 | Kamata et al. | 428/826 |
| 2003/0091865 A1 * | 5/2003 | Chen et al. | 428/693.1 |
| 2003/0116531 A1 * | 6/2003 | Kamins et al. | 216/41 |
| 2003/0203314 A1 * | 10/2003 | Sebald et al. | 430/296 |

(Continued)

FOREIGN PATENT DOCUMENTS

JP   03-040219   7/1989

(Continued)

OTHER PUBLICATIONS

JA 10-320772 Translation May 22, 1997.*

(Continued)

*Primary Examiner*—Kevin M. Bernatz
*Assistant Examiner*—Louis Falasco
(74) *Attorney, Agent, or Firm*—Stites & Harbison PLLC; Juan Carlos A. Marquez, Esq.

(57) ABSTRACT

A method for producing a recording medium provides good throughput for mass production and reduces cost. The method facilitates the control of the shape or dimensions of a pattern obtained by microfabrication, allows an accurate pattern transfer, and provides superior uniformity. A magnetic layer is formed on a substrate. A nano-particle film 16 is formed on a desired portion on the magnetic layer. Using the nano-particle film as a mask, the magnetic layer is cut. A micropattern with concavities and convexities is formed on the magnetic layer by removing the nano-particle film.

14 Claims, 14 Drawing Sheets

U.S. PATENT DOCUMENTS

| | | | |
|---|---|---|---|
| 2004/0089410 A1* | 5/2004 | Tenne et al. | 156/230 |
| 2005/0079282 A1* | 4/2005 | Jin | 427/127 |
| 2005/0079551 A1* | 4/2005 | Mizuno et al. | 435/7.1 |

FOREIGN PATENT DOCUMENTS

| | | |
|---|---|---|
| JP | 08-155379 | 12/1994 |
| JP | 09-097419 | 7/1996 |
| JP | 10-320772 | 5/1997 |
| JP | 11-066654 | 8/1997 |
| JP | 2000-020945 | 7/1998 |
| JP | 2002-359138 | 12/2001 |
| JP | 2003-151127 | 3/2002 |
| JP | 2003-218346 | 12/2002 |

OTHER PUBLICATIONS

T. Aoyama et al., "Fabrication of Perpendicular Patterned Media by Nano-Imprint Method", Digest of the 25$^{th}$ Annual Conference on Magnetics in Japan (2001), in Japanese (pp. 240a-240b) and in English (2 pages).

S. Okawa et al., "MFM Analysis of Perpendicular Patterned Media Filled with Non-Magnetic Material", Digest of the 25$^{th}$ Annual Conference on Magnetics in Japan (2001), in Japanese (p. 22) and in English (1 page).

Japanese Patent Office Notice of Rejection dated Jan. 13, 2009, in Japanese.

* cited by examiner (PRIOR ART)

METHOD FOR PRODUCING RECORDING MEDIUM, RECORDING MEDIUM EMPLOYING SAID METHOD, AND INFORMATION RECORDING AND REPRODUCING APPARATUS

CLAIM OF PRIORITY

The present application claims priority from Japanese application JP 2004-155005 filed on May 25, 2004, the content of which is hereby incorporated by reference into this application.

BACKGROUND OF THE INVENTION

1. Field of the Invention

The present invention relates to a method of manufacturing a magnetic recording medium or a thermomagnetic or optical-magnetic recording medium used in magnetic disk units or the like, and to an information recording and reproducing apparatus using these recording media.

2. Background Art

In response to the increase in capacity of magnetic recording apparatus in recent years, efforts are being made to also increase the recording density of magnetic recording media. As the recording density increases, the single recording-bit size decreases, resulting in a pronounced superparamagnetic effect in which the magnetization on the magnetic recording film on the medium becomes thermally destabilized. As an index of the superparamagnetic effect, $KuV/KT>40$ is often employed, where Ku is uniaxial anisotropy constant, V is the volume of a single magnetic particle, K is the Boltzmann constant, and T is temperature. From the aforementioned expression, it is seen that, if the recorded magnetization is to be stabilized against the superparamagnetic effect, either the volume of the magnetic particle should be increased, or a material with a large uniaxial anisotropy constant (Ku) should be used in the recording film.

The current media are continuous media where the individual recording bits are made up of a number of magnetic particles. Accordingly, the recording film is required to employ a magnetic material with a large uniaxial anisotropy constant (Ku) value to achieve higher recording densities, from the viewpoint of preventing superparamagnetic effect. This necessarily requires an increase in the recording magnetic field intensity. Thus, the designing and manufacturing of a recording head capable of providing a large recording magnetic field intensity poses a challenge in the development of recording heads.

On the other hand, in patterned media where the individual recording bits are made up of single magnetic particles, because the volume (V) occupied by a single particle is large, there is no need to use a material with large uniaxial anisotropy constant (Ku) values for preventing superparamagnetic effect. As a result, the patterned media can record with a smaller magnetic field intensity than in the case of the aforementioned continuous media. The patterned media method also has the advantage that it does not produce noise due to disturbance in magnetization in the bit transition region. Therefore, the patterned media are expected to provide a promising method for high-density magnetic recording media in the future in combination with the perpendicular recording method, which is capable of achieving higher recording densities than the longitudinal recording method.

In the patterned media method, because the individual recording bits are made up of single magnetic particles, adjacent recording bits, namely, the particles, must be magnetically disconnected. FIG. 1 shows a schematic representation of a patterned medium. In the figure, numeral 1 designates a magnetic layer, 2 designates a micropattern of a recording bit formed by processing the magnetic layer, 3 designates an intermediate layer, 4 designates a soft magnetic layer, and 5 designates a substrate.

In the conventional patterned media, individual recording bits are formed by microfabrication, as shown in FIG. 1. FIG. 2 shows a typical method of microfabrication. As shown in FIG. 2A, a resist layer 6 is formed on a magnetic layer 1, and further a resist pattern 7 with concavities and convexities is formed by lithography. Then, as shown in FIG. 2B, using the resist pattern as a mask, the magnetic layer 1 is cut by a focused ion beam (FIB) using Ga ion 8. The resist layer is thereafter removed, thereby preparing a recording bit 2 as shown in FIG. 2C. The space between the recording bit 2 and the adjacent recording bit 2 may be filled with a non-magnetic layer 9 after the cutting process and then made flat, as shown in FIG. 2D. In another example of pattern formation, an imprint process as shown in FIG. 3 is used. In the imprint process, a SiN substrate is processed by electron beam lithography or the like to prepare a pattern mold 10. The pattern mold 10 is pressed against the resist layer 6 as shown in FIG. 3A to transfer the pattern 7 on the resist film as shown in FIG. 3B. Thereafter, as shown in FIG. 3C, the magnetic layer is cut by reactive ion etching (RIE), thereby preparing the recording bit 2 as shown in FIG. 3D. As a RIE gas 11, carbonyl gas is often used. The imprint process is disclosed in Non-patent Documents 1 and 2.

In a method disclosed in JP Patent Publication (Kokai) No. 2002-359138 A, a ferromagnetic layer formed on a substrate is selectively masked and then exposed to a reactive gas containing halogen, whereby an exposed portion and the underlayer are chemically altered into a non-magnetic ferromagnetic region by chemical reaction. In this example, the mask utilizes the self-organizing phenomenon of a block copolymer comprising two types of polymers with different dry etch resistance. After the self-organization, the polymer at portions with low dry etch resistance are removed during etching, and the lower magnetic layer is chemically altered by the etch gas. At portions with high dry etch resistance, the polymer remains even during etching, such that the lower magnetic layer does not become altered and its magnetic characteristics remain good. Thus, magnetic recoding can be performed at these portions. In JP Patent Publication (Kokai) No. 2003-151127 A, nanodots are arranged on the substrate using an ion beam or the likes, and a layer of magnetic material is formed such that the spaces (wells) between the nanodots are filled by the magnetic material. The material is thereafter removed such that the regularly arranged structure of the wells filled with the magnetic material can be exposed, thereby preparing a patterned magnetic recording medium. JP Patent Publication (Kokai) No. 2003-218346 A discloses a method of forming a fine pattern using a nano-particle. In this method, nano-particles arranged on a substrate are etched using a mask to form nanopores (opening), in which various materials including a magnetic material can be filled so as to produce a variety of kinds of devices.

As described above, when preparing a patterned medium, in which individual recording bits are formed by single magnetic particles, the magnetic layer is formed into a desired shape by microfabrication. In addition, a discrete track medium is known in which grooves are formed between recording tracks by microfabrication on a continuous medium in which the magnetic layer has been formed by the conventional sputtering method. FIG. 4 schematically shows a discrete track medium. As shown, in the discrete track medium, a groove 13 is cut between recording tracks 12. Numeral 14 indicates the direction across the tracks. Thus, in the discrete track medium, because the recording tracks are physically separated from the adjacent tracks, cross-talk during the recording or writing with a read head or a write head can be reduced as compared with the current continuous media, thereby advantageously improving the SN ratio.

Non-Patent Document 1: "Fabrication of perpendicular patterned media by nano-imprint method": Digest of the 25$^{th}$ Annual Conference on Magnetics in Japan (2001), p. 240

Non-Patent Document 2: "MFM analysis of perpendicular patterned media with no magnetic material": Digest of the 25$^{th}$ Annual Conference on Magnetics in Japan (2001), p. 22

Patent Document 1: JP Patent Publication (Kokai) No. 2002-359138 A

Patent Document 2: JP Patent Publication (Kokai) No. 2003-151127 A

Patent Document 3: JP Patent Publication (Kokai) No. 2003-218346 A

SUMMARY OF THE INVENTION

In a patterned medium, assuming that the aspect ratio (bit length to track width) of a recording bit is 1:1, the bit length (track width) in the case of the areal recording density of 1 Tb/in$^2$ is 25.4 nm. In the discrete track media too, it is required to form a groove between the recording tracks by microfabrication which is narrower than the width of a recording track, which requires microfabrication on the order of 100 nm or smaller. Although microfabrication on this order is possible with the electron beam lithography or reduction X-ray lithography technologies, the resultant throughput or price would not be realistic from the viewpoint of mass production.

Further, in the aforementioned imprint method, the magnetic layer is cut by FIB using a resist film with the concavity-convexity pattern transcribed by imprinting. In this case, because the etching rate of the magnetic layer is low, the resist mask could be damaged, which would make it difficult to control the shape or dimensions of the micropattern obtained by processing. There is also the problem in the imprint method in that, when transferring the pattern on the pattern mold onto the resist film, part of the resist could be transported to the pattern mold, thereby preventing an accurate pattern transfer. In the microfabrication of a magnetic material using the RIE method, too, as in the case of the FIB process, the etching rate of the magnetic layer is low and the selectivity between the magnetic layer and the resist layer is poor, making it difficult to control the shape or dimensions of the processed micropattern.

When the self-organization of a block copolymer is utilized in JP Patent Publication (Kokai) No. 2002-359138 A, the structure of the block copolymer is limited, resulting in a low degree of freedom for forming an etch mask with a desired size at a desired position on the substrate. Although the composition of the etch mask is organic, it is a polymer and can therefore be easily worn by the cutting process. Thus, there is the problem that it is difficult to control the shape or dimensions of the processed micropattern. In the case of the method disclosed in JP Patent Publication (Kokai) No. 2003-151127 A, nanodots are formed on the surface of a substrate by an ion beam or the like. Because the arrangement or size of the dots is dependent on the beam forming conditions, it is difficult to arrange nanodots with a uniform size on the entire surface of a substrate in a dense manner. Thus, it is difficult to control the shape or dimensions of the processed micropattern (nanodots). In the method disclosed in JP Patent Publication (Kokai) No. 2003-218346 A, a magnetic material is embedded in nanopores (openings) formed in a substrate. The structure of the recent magnetic recording media is becoming increasingly more complex, with films of various compositions being layered to form a recording medium. Therefore, it is difficult to embed a magnetic recording material with a complex film structure in all of the nanopores formed in the substrate in a uniform manner.

It is therefore an object of the invention to provide a method of producing a low-cost recording medium with a high throughput for mass production in which the shape or dimensions of a pattern obtained by microfabrication can be easily controlled and which enables an accurate pattern transfer with superior uniformity. Another object of the invention is to provide a recording medium manufactured by the method and an information recording and reproducing apparatus utilizing the medium.

In order to achieve the aforementioned objects, the invention provides a method comprising the steps of: forming a magnetic layer on a substrate; forming a nano-particle film on a desired portion of the magnetic layer; cutting the magnetic layer using the nano-particle film as a mask; and forming a micropattern with convexities and concavities by removing the nano-particle film. A recording medium of the invention comprises a magnetic layer patterned using a nano-particle film as a mask.

In accordance with the invention, a method for producing a magnetic recording medium is provided which is suitable for mass production, facilitates the control of the processed shape or dimensions, and enables an accurate pattern transfer. Using this method, a magnetic recording medium of high recording densities and a large-capacity magnetic disk unit can be provided.

DESCRIPTOIN OF THE PREFERRED EMBODIMENTS

Figure 1:
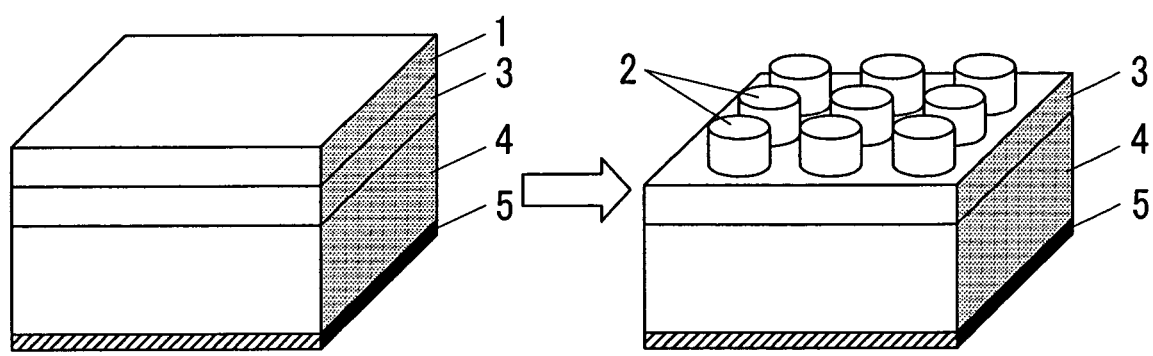
FIG. 1 schematically shows a patterned medium.
Figure 2A:
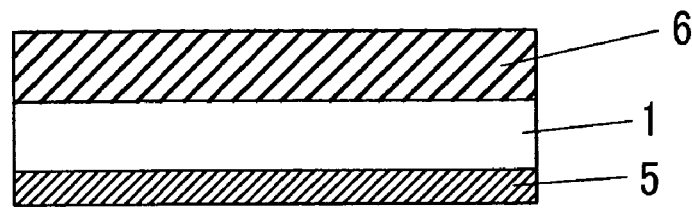
FIGS. 2A to 2D show a typical method of microfabrication.
Figure 2B:
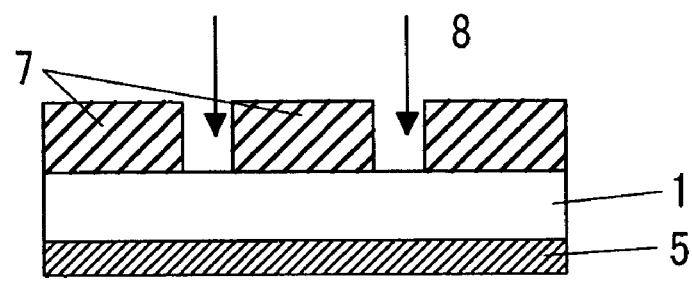
Figure 2C:
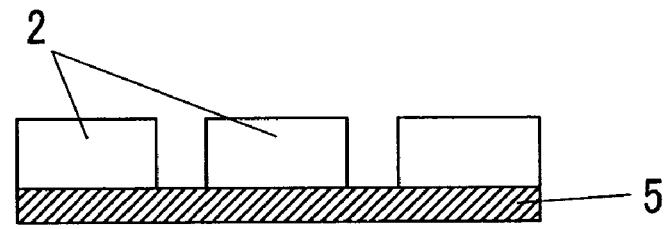
Figure 2D:
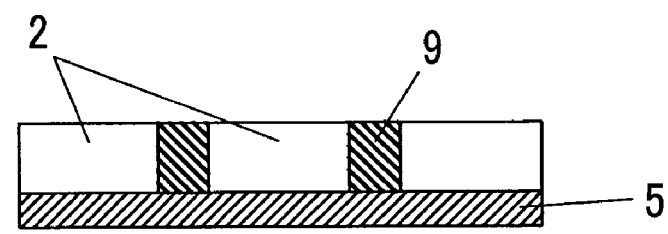
Figure 3A:
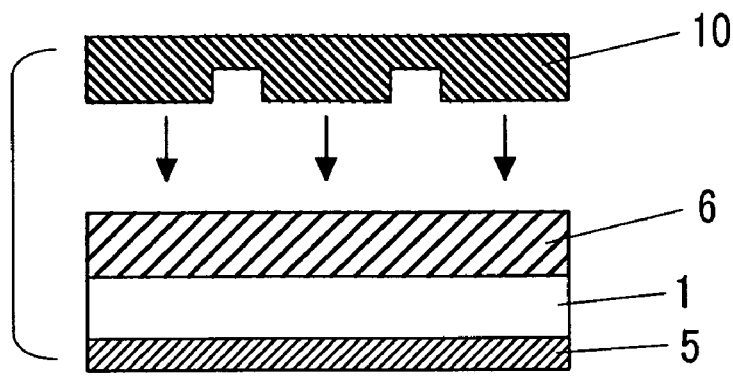
FIGS. 3A to 3D show pattern formation using an imprint method.
Figure 3B:
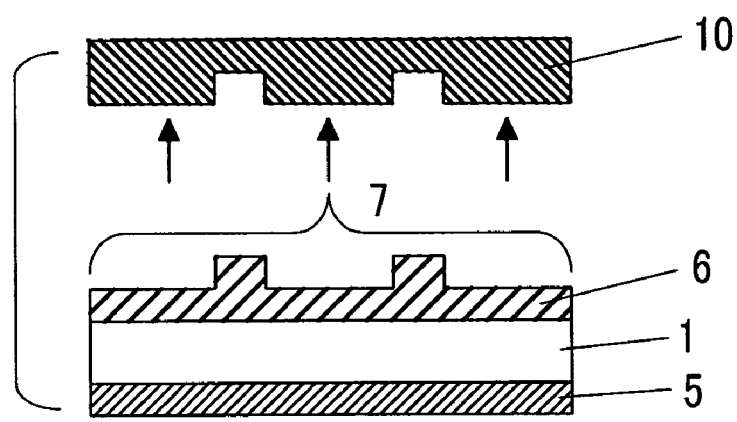
Figure 3C:
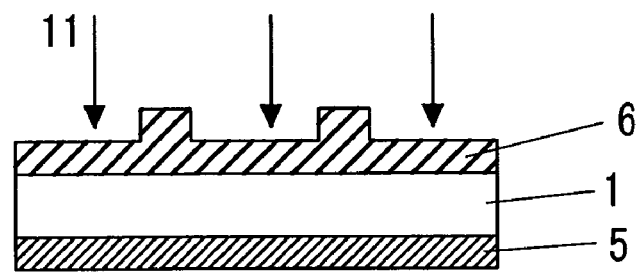
Figure 3D:
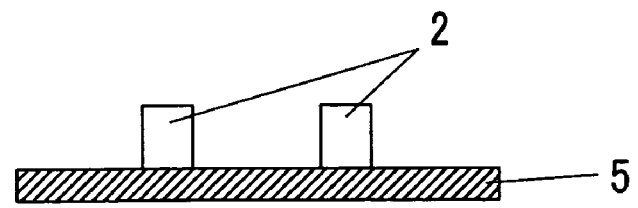
Figure 4:
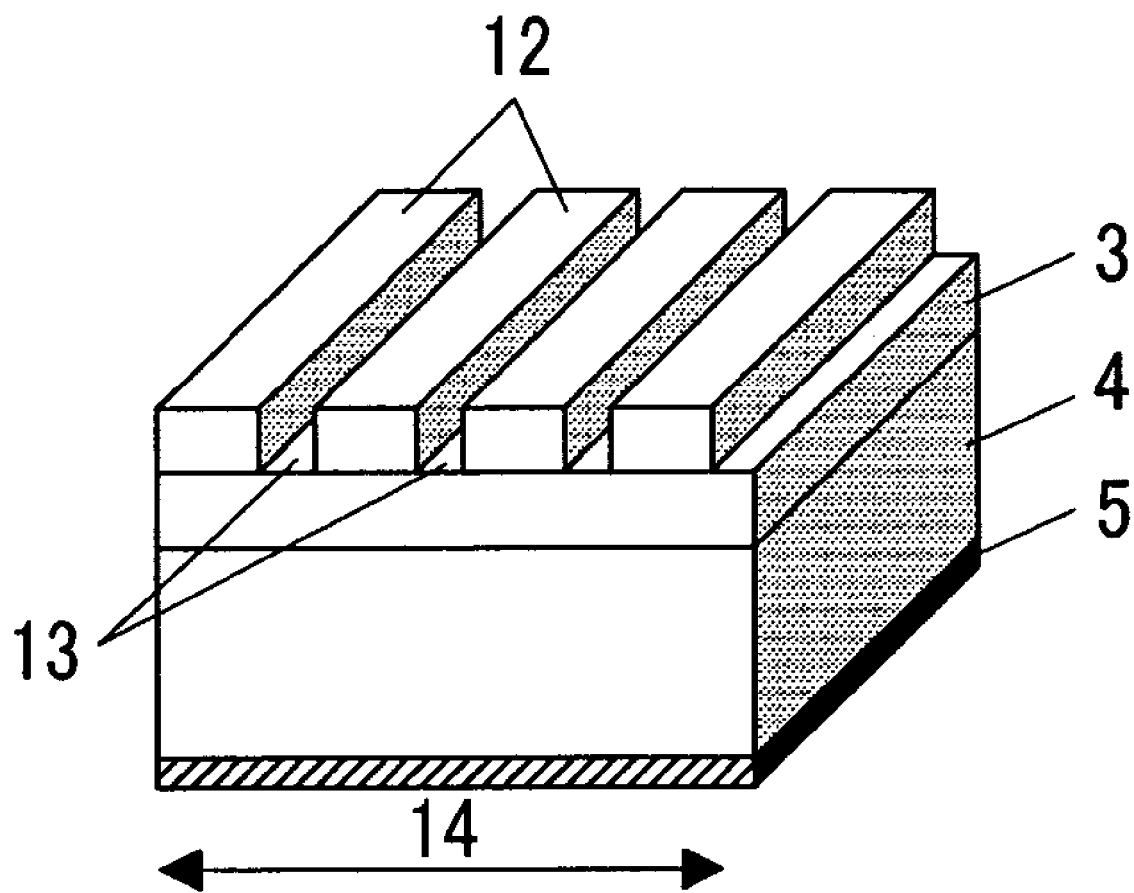
FIG. 4 schematically shows a discrete track medium.
Figure 5A:
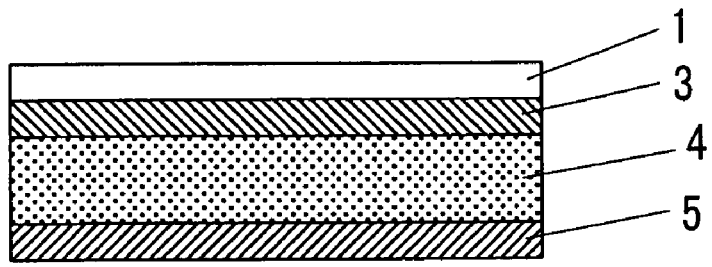
FIGS. 5A to 5D show a process for preparing a micropattern using nano-particles as a mask.
Figure 5B:
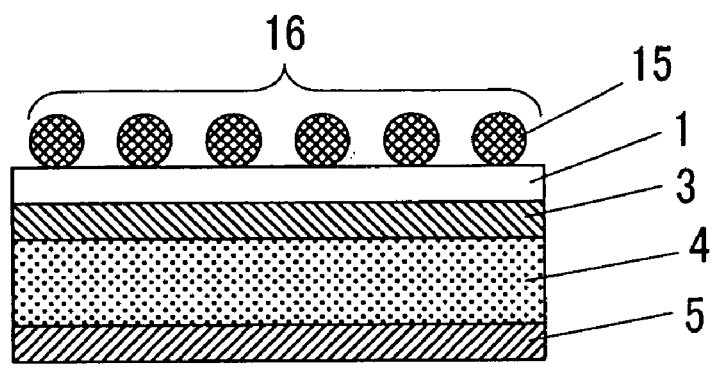
Figure 5C:
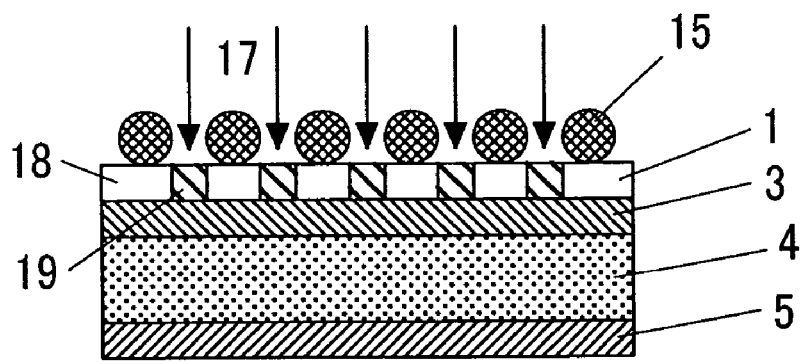
Figure 5D:
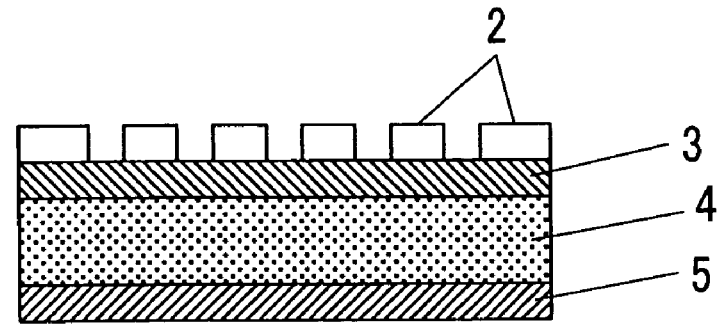
Figure 6A:
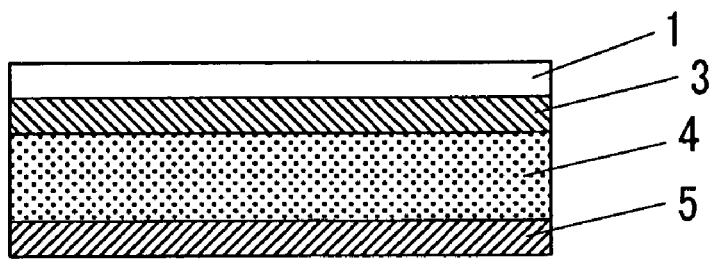
FIGS. 6A to 6D show a process for preparing a micropattern using nano-particles as a mask.
Figure 6B:
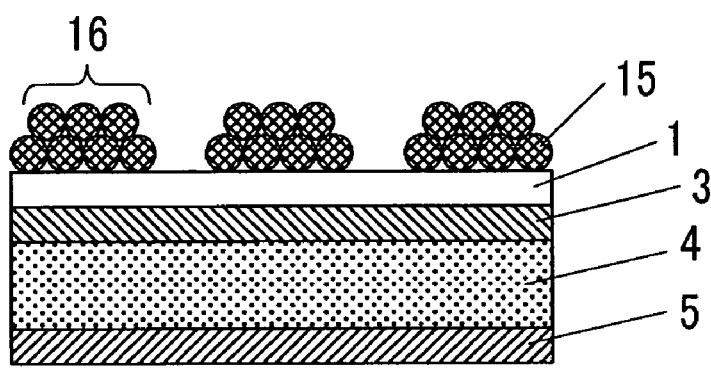
Figure 6C:
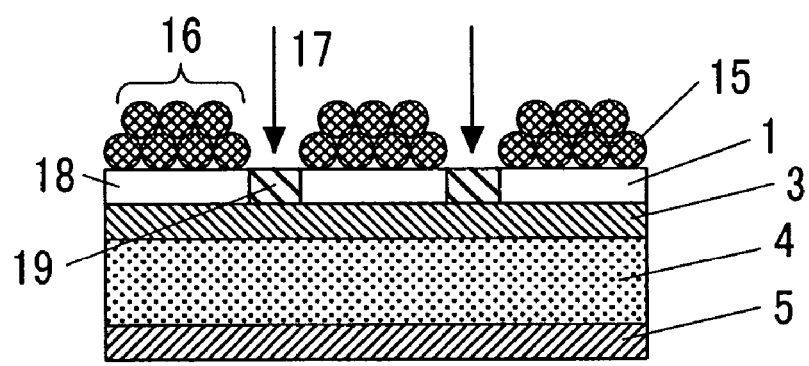
Figure 6D:
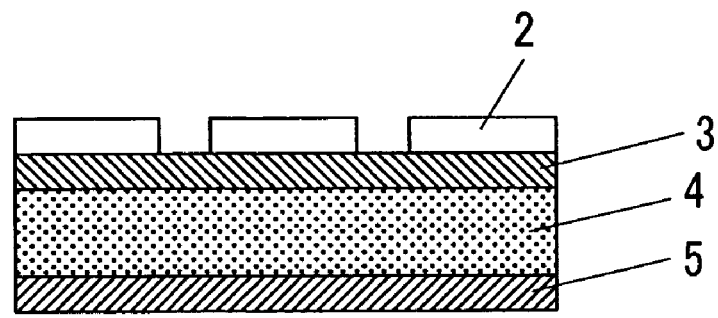

With reference to FIGS. 5 and 6, a method of producing a micropattern using a nano-particle film as a mask in accordance with the invention is described. FIG. 5 shows an example where a film made of nano-particles of a relatively large diameter is used as a mask. In a first step, a magnetic layer 1 for magnetic recording or optical-magnetic recording is formed on a substrate 5, as shown in FIG. 5A. Between the substrate 5 and the magnetic layer 1, a soft magnetic layer 4 or an intermediate layer 3 may be formed. In a second step, as shown in FIG. 5B, a nano-particle film 16 made of nano-particles 15 is formed on the magnetic layer 1. In a third step, as shown in FIG. 5C, the magnetic layer is cut using a gas or ion 17, with the nano-particle film 16 used as the mask. A portion 18 of the magnetic layer 1 is masked by the nano-particles 15 and is therefore not cut. A portion 19 is a non-masked region on which no nano-particles exist and is therefore cut. Thereafter, when the nano-particle film is removed, a micropattern 2 can be obtained from the magnetic layer that has been cut, as shown in FIG. 5D.

FIG. 6 shows another example in which the cutting process is performed using a film of nano-particles with a relatively small diameter as a mask. A first step shown in FIG. 6A is similar to the first step of FIG. 5. In a second step, as shown in FIG. 6B, a nano-particle film 16 of nano-particles 15 with the diameter of 1 to 10 nm is partially disposed on the magnetic layer 1. As compared with the example of FIG. 5, because the diameter of the nano-particles is smaller, the interval of the particles can be made denser. Although the nano-particle film may comprise a single layer of particles, the nano-particles are preferably formed in multiple layers so as to increase the resistance of the nano-particle film as a cut-preventing mask. In this example, the nano-particle film 16 consisting of a dense arrangement of the nano-particles with a smaller diameter corresponds to a single nano-particle with a larger diameter shown in FIG. 5. Thereafter, in a third step, as shown in FIG. 6C, a cutting process is performed using the nano-particle film 16 as a mask. A portion where the nano-particle film 16 exists is a masked region 18 that is not cut. A portion 19 where no nano-particle film 16 exists is cut. Thus, when the nano-particle film is removed in a fourth step as shown in FIG. 6D, a micropattern 2 can be obtained from the magnetic layer that has been cut.

The magnetic layer formed on the substrate may be formed by a magnetic recording layer containing at least one type of element selected from Co, Ni, Mn, Sm, Pt, Pd, and Cr. It is also possible to use a magnetic recording layer composed of an intermetallic compound of these elements, a binary alloy, a tertiary alloy, an amorphous substance, and an oxide. Examples are films used for magnetic recording, such as a Co film, a CoPt film, a CoCrPt film, and a multilayered film of Co and Pd. To prepare for the future increase in recording density, it is also possible to use FePt, FePd, CoPt, or CoPd with a large uniaxial anisotropy constant (Ku). Alternatively, the magnetic recording layer may be formed by a tertiary magnetic layer of FePt, FePd, CoPt, or CoPd to which a third element is added. The third element may be Cu, Ag, Au, Ru, Rh, Ir, Pb, Bi, or B. Other elements may also be used as the third element. It is further possible to use a complex film consisting of any of these films as a main body to which another element or component is added. Also, a granular film may be used that consists of CoPt as the main component to which $SiO_2$ is added. A TbFeCo alloy film used for optical-magnetic recording may also be used, either as is or as mixed with another component. Compositions other than those mentioned above may also be used for the magnetic layer. The magnetic layer for magnetic recording that is formed on the substrate may be a magnetic layer for longitudinal magnetic recording, perpendicular magnetic recording, or optical-magnetic recording.

The nano-particle film formed on a desired portion on the magnetic layer may be a film of nano-particles containing at least one type of element selected from Au, Pt, and Pd. The composition of the nano-particles may consist of an intermetallic compound, a binary alloy, or a tertiary alloy of the aforementioned elements. As the materials of the nano-particles, it is important to select those materials that are more difficult to be cut than the material of the magnetic layer, which is cut. By so doing, the nano-particle film can provide a good mask during the cutting of the magnetic layer.

Figure 7A:
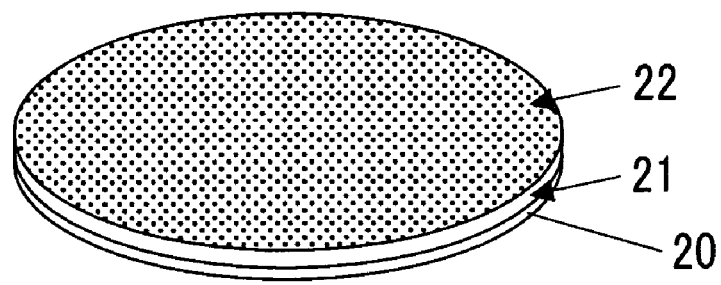
FIGS. 7A to 7C show various types of nano-particle films formed on a magnetic layer.
Figure 7B:
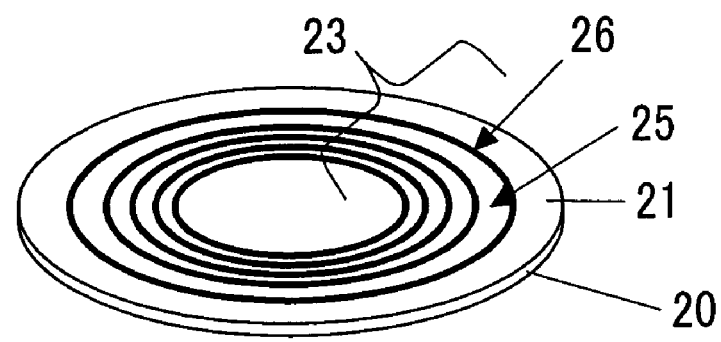
Figure 7C:
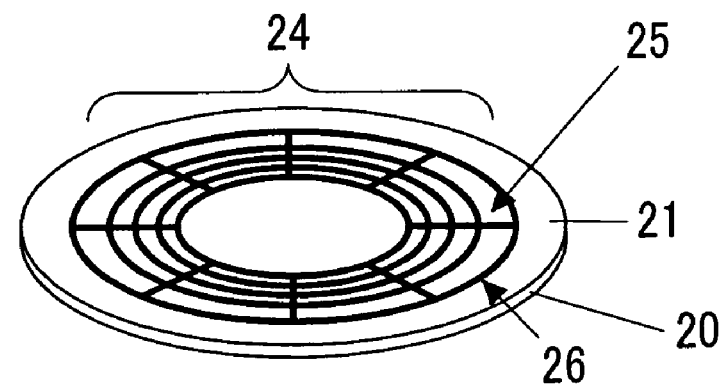

The nano-particle film may be formed either entirely on the surface of the magnetic layer, or at a desired portion on the magnetic layer concentrically or in a lattice, as shown in FIGS. 7A to 7C. The nano-particle film formed on a desired portion on the magnetic layer may employ films other than those shown in FIGS. 7B and 7C. In FIG. 7, numeral 20 designates a substrate, 21 a magnetic layer, 22 a nano-particle film formed on the entire surface of the magnetic layer, 23 a nano-particle film formed concentrically, and 24 a nano-particle film formed in a lattice. Numeral 25 designates a portion masked by the nano-particles, and 26 a portion not masked by the nano-particles.

The nano-particle film may be prepared by the Langmuir-Blodgett (LB) method, or a spin coating method. The nano-particle film may also be formed on the magnetic layer by coating an adhesive compound on the entire surface of the magnetic layer and then coating a solution of nano-particles on the magnetic layer by spin coating. Alternatively, the nano-particle film may be formed on the magnetic layer by immersing a substrate with the magnetic layer in a solution of nano-particles and then lifting it. The nano-particle film can be formed on the entire surface of the magnetic layer by any of these three methods. Other methods may also be employed. The nano-particle film that exists partially on the magnetic layer, as shown in FIGS. 7B and 7C, may be formed by transferring an adhesive compound coated on convex portions of the pattern mold onto the magnetic layer and then arranging the nano-particles on the adhesive material, as will be described later. Because the LB method, spin coating method, and the method employing an adhesive compound involve the direct formation of a nano-particle film on the processed magnetic layer as the mask, they allow a high throughput to be obtained during mass production, thereby making it possible to produce a recording medium at low cost.

Figure 8A:
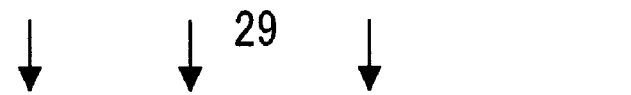
FIGS. 8A to 8D show another process for forming a nano-particle film on a desired portion on a magnetic layer.
Figure 8B:
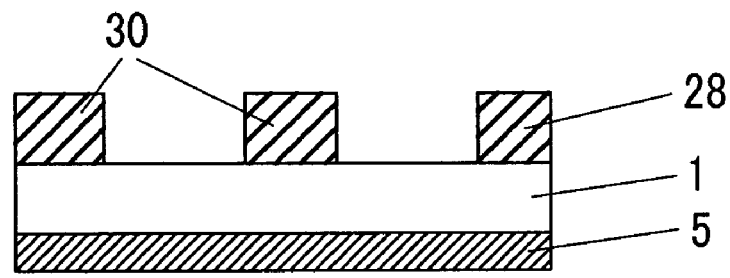
Figure 8C:
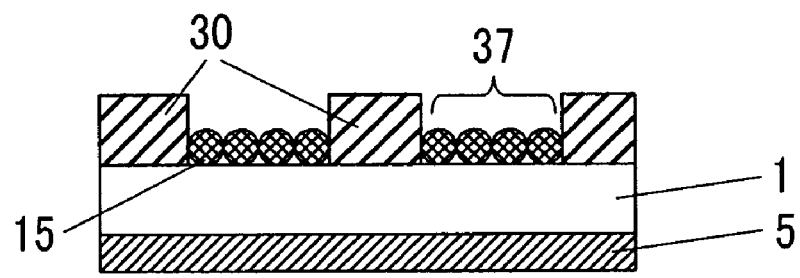
Figure 8D:
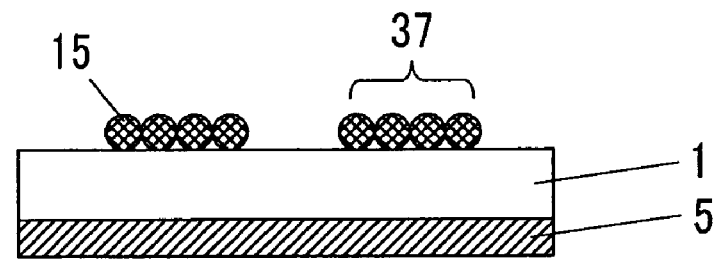
Figure 9A:
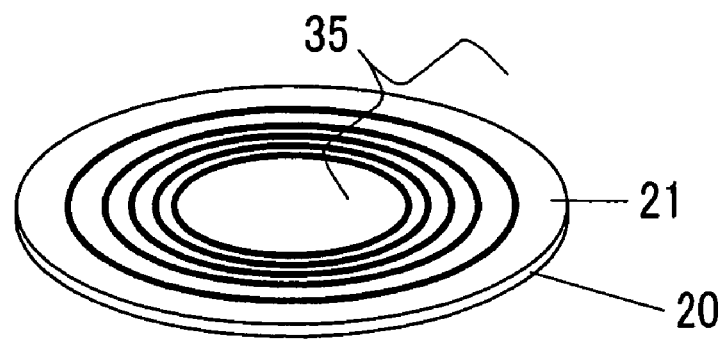
FIGS. 9A and 9B show various types of resist patterns formed on a magnetic layer.
Figure 9B:
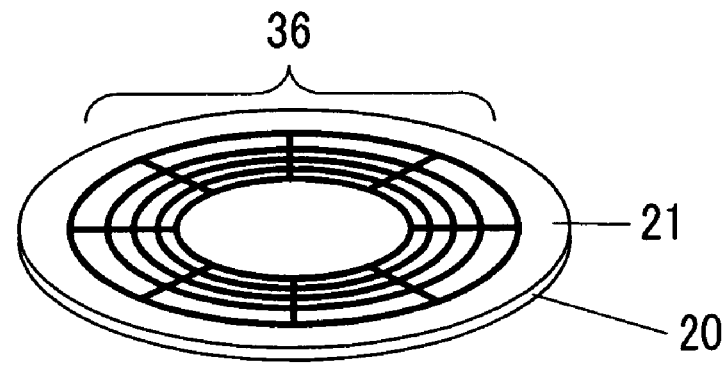

The nano-particle film may also be formed at a desired portion on the magnetic layer by the following method. Referring to FIG. 8, a resist film 28 is formed on the magnetic layer 1, and a latent image of a desired micropattern is formed in the resist film using electron beam (EB) lithography or optical lithography 29. The resist layer is then developed to expose a micropattern 30 on the magnetic layer. In the illustrated example, the formed resist micropattern consists of a concentric line-and-space pattern, as shown in FIG. 9A. It is also possible to use a lattice-shaped resist pattern 36 such that, as shown in FIG. 9B, concentric lines intersect with lines extending radially from the center of the substrate. Between the thus formed resist patterns on the magnetic layer, nano-particles 15 can be embedded, as shown in FIG. 8C. In this figure, numeral 37 designates the nano-particle film embedded between the resist patterns. The embedding may involve immersing the substrate in a solution of nano-particles and then lifting it. It may also involve the spin-coating of a solution of nano-particles and embedding the nano-particles between the resist patterns. After the nano-particles have been embedded, RIE is performed using an oxygen gas, whereby the resist micropattern 30 formed by organic matter can be eliminated and a nano-particle mask with the nano-particle film partially formed thereon can be obtained.

The nano-particles making up the nano-particle film formed on a desired portion on the magnetic layer preferably are substantially spherical in shape and have a diameter range of 1 nm or more and 100 nm or less. The gain size distribution of the particles is preferably 10% or less, and the nano-particles are preferably arranged in one or more layers in a substantially regular manner. Substantially spherical nano-particles with the diameter of 1 nm or greater and 100 nm or smaller can be easily prepared, and these sizes are suitable for the microfabrication of the magnetic film for a patterned medium or a discrete track medium. Using nano-particles with the grain size distribution of 10% or less allows the uniformity of the nano-particle film to be maintained. As a result, the dimensions of the pattern on the magnetic layer that will be obtained in the subsequent cutting process can be easily controlled.

The thus obtained nano-particle film that exists on a desired portion on the magnetic layer is used as a mask during the cutting of the magnetic layer. The cutting can be performed using a FIB or by RIE. When the FIB method is used, the cutting process is performed using mainly Ga ion. In accordance with the present invention, nano-particles with a metallic core are used as the mask. Therefore, the mask is less likely to be worn by the Ga ion than when the mask is formed by a resist consisting of an organic compound. For this reason, the mask pattern can be transferred onto the magnetic layer accurately.

When RIE is used in the cutting process, the magnetic layer etch gas mainly consists of a gas mixture of halogen, such as chlorine, CO, $CO_2$, and $NH_3$. Other etch gases may also be used. In the case of RIE too, since the etch mask is formed by metallic nano-particles, it has a higher dry etch resistance than a resist mask and wears less during etching. Thus, the mask pattern can be transferred onto the magnetic layer accurately by RIE.

As described above, the fine concave-convex pattern formed on the magnetic layer by cutting the nano-particle film has a shape that reflects the shape of the nano-particles. When spherical nano-particles are used, the magnetic layer after the cutting process will have a cylindrical micropattern. By optimizing the FIB or RIE conditions, the diameter of the spherical nano-particles can be made substantially equal to the diameter of the substantially cylindrical convex micropattern formed on the magnetic layer. When the diameter of the spherical nano-particle is 20 nm or more and 100 nm or less, the diameter of the pattern on the magnetic layer obtained by the cutting process will reflect the diameter of the nano-particles, namely, 20 nm or more and 100 nm or less. This pattern size is most suitable for the patterned recording media, in which the individual recording bits are formed by single magnetic particles. In this case, a single magnetic layer pattern that has been cut is the minimum unit for recording. When the diameter of the magnetic layer obtained by microfabrication is approximately 25 nm, the patterned recording medium would have a recording density of 1 $Tb/in^2$.

When the diameter of the spherical nano-particles is 1 nm or more and less than 20 nm, the nano-particle film is preferably formed concentrically or in a lattice at a desired portion on the magnetic layer, as shown in FIGS. 7B and 7C. When the nano-particle film is concentrically disposed on the magnetic layer, as shown in FIG. 7B, the pattern obtained by the cutting process would be concentric in shape. A patterned medium of such a shape can be used as a discrete track medium. When the nano-particle film on the magnetic layer is formed in a lattice, as shown in FIG. 7C, a lattice-shaped micropattern would be obtained by the cutting process, which can be used as a patterned medium. Spherical nano-particles with the diameter of 1 nm or more and 20 nm or less can be easily prepared by chemical synthesis. Further, this diameter range makes it possible to easily prepare a multilayered film in which nano-particles are layered, so that a strong mask for the cutting process can be formed.

The magnetic layer thus cut using the nano-particle film as an etch mask can be used as the recording layer in a patterned recording medium in which individual recording bits are formed by single magnetic particles, or in a discrete track medium in which individual recording bits are formed by a plurality of magnetic particles and in which adjacent recording tracks are partially disconnected by a cutting process. In these cases, the recording method may involve longitudinal magnetic recording, perpendicular magnetic recording, or optically or thermally assisted magnetic recording.

In the following, the present invention is described in greater detail by way of embodiments. It should be understood, however, that the invention is not limited by these embodiments.

Embodiment 1

Initially, a nano-particle as the material for a mask was prepared. Several processes are known for manufacturing nano-particles, of which a chemical synthetic process that will be described below is the most suitable for obtaining nano-particles with uniform grain size with a grain size distribution or 10% or less. A metal ion as a raw material was reduced in an organic solvent or an inorganic solvent containing water, thereby obtaining a metal atom. The metal atom, or a metal atom obtained by removing coordinate organic compounds around the metal atom, was then subjected to nucleus growth to obtain a metal nano-particle with a desired grain size. The metal ion or metal atom as the raw material may consist of a single element or a plurality of elements. When a plurality of elements are involved, an alloy nano-particle can be obtained. The grain size in the diameter range of 1 nm or greater and 100 nm or less can be controlled by optimizing factors such as the structure of the organic compounds that surround the metal nano-particle, which are referred to as ligands, the combination of a plurality of ligands, the amount of ligands fed in the material, and the timing of addition of ligands during the synthesizing process, for example. Further, by optimizing the factors such as the structure of the organic compounds as ligands and the combination of ligands, a nano-particle with a desired shape can be obtained. The most common shape of nano-particles that is obtained by chemical synthesis is that of a sphere or a regular polyhedron. By using two or more types of ligands in combination, a nano-particle with a spindle-shape can be synthesized.

A solution of the nano-particles thus obtained by chemical synthesis can be put into a centrifuge to select nano-particles with a specific diameter (namely, weight) depending on weight, so that the grain size distribution of the nano-particle can be controlled to be 10% or less. The molecular structure of the ligands surrounding the nano-particles is an important factor determining the nano-particle interval when a nano-particle film is formed. If a ligand with a large molecular weight and with a long-chain structure is used, the interval between nano-particles in the nano-particle film would be larger, while the particle interval would be smaller if a ligand with a small carbon number and molecular weight is used. It is known that, if oleic acid, which is often used in nano-particles of Co or Fe, is used, the interval between nano-particles would be 2 to 4 nm. If hexanoic acid, which has a smaller molecular weight than oleic acid, is used as a ligand, the nano-particle interval would be smaller at 1 to 2 nm.

Using the aforementioned chemical synthesis method, an Au nano-particle was prepared. Au was selected as the material for the nano-particle because it has a sufficient resistance to the cutting operation performed on the magnetic layer. An actual synthesis process is described below. Au ion was reduced in an organic solvent to obtain a solution of colloidal Au nano-particles. The solution was put in a centrifuge to perform size selection, thereby obtaining a solution of colloidal Au nano-particles with a grain size distribution of 10% and the diameter of the metallic nucleus of 20 nm. The Au nano-particle were coated with dodecanethiol ($CH_3$—$(CH_2)_{11}$—SH), which is an organic compound with a length of 4 nm, and were dispersed in an alcohol solvent in the form of a colloid.

Figure 10A:
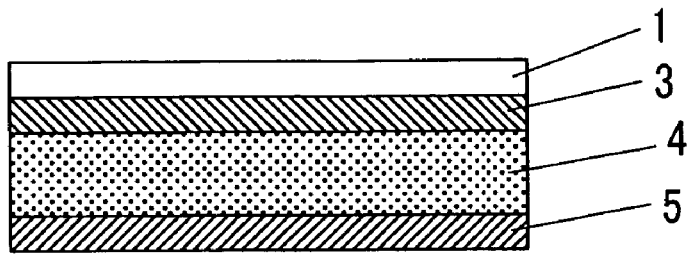
FIGS. 10A to 10E show Embodiments 1 and 2.
Figure 10B:
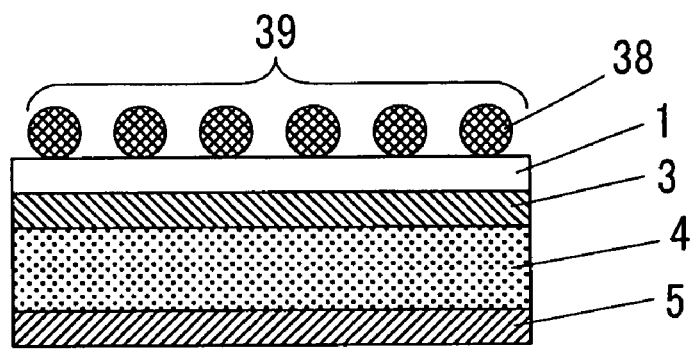

Then, as shown in FIG. 10A, a soft magnetic layer 4, an intermediate layer 3, and a magnetic layer 1 as the magnetic recording layer were layered in such order on a substrate 5 of glass by sputtering. The soft magnetic layer had Co as the primary component and a film thickness of 300 nm. The intermediate layer had Ru as the primary component and a film thickness of 20 nm. The magnetic recording layer was formed by a CoCrPt film (with a film thickness of 20 nm), which has perpendicular anisotropy. The aforementioned solution of colloidal Au particles was applied dropwise to the magnetic layer and then spin-coated therewith. The magnetic layer was pre-baked at 60° C. for 10 min, thereby completely evaporating the coated solvent. By selecting the molecular weight and structure of the compounds with which the nano-particles are coated, adjusting the concentration of the colloidal solution, and optimizing the spin conditions, the spin coating process makes it possible to form a film of nano-particles that are closely packed with a substantially regular arrangement on the entire surface of the magnetic layer. In the present embodiment, using a solution of colloidal Au nano-particles coated with dodecanethiol with the length of 4 nm and having a diameter of 20 nm, and by optimizing the spin coating conditions, a nano-particle film with the Au nano-particles substantially regularly arranged in a single layer was obtained. The ligand of the Au nano-particles used in the present embodiment was dodecanethiol, which has a high self-organizing property. For this reason, the arrangement of the particles after spin coating, when looked at from above, was that of a substantially regular hexagonal lattice, as shown in FIG. 10E. As a result, as shown in FIG. 10B, a single layered film 39 of a substantialy regular arrangement of the Au nano-particles 38 was formed on the entire surface of the magnetic layer.

Figure 10C:
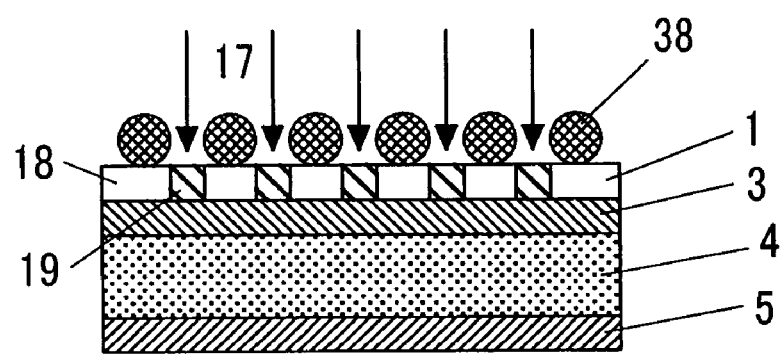
Figure 10D:
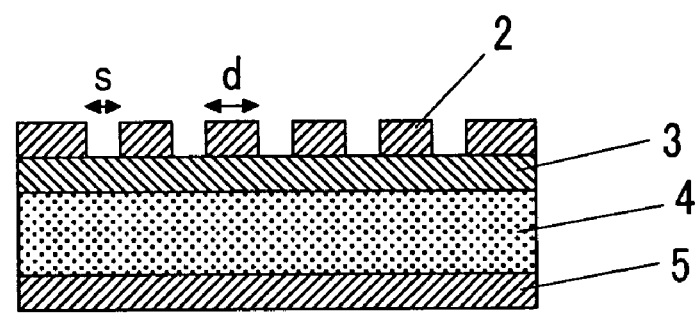
Figure 10E:
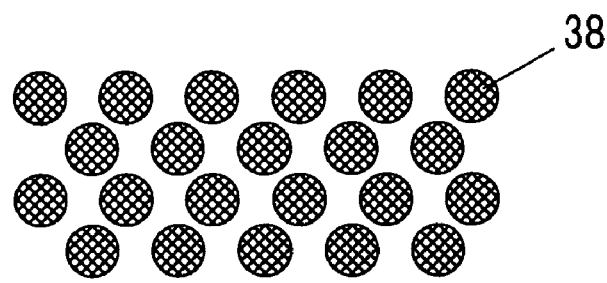

Thereafter, as shown in FIG. 10C, anisotropic dry etch (RIE; 17) was performed on the CoCrPt film on the magnetic layer 1, using the nano-particle film as a mask and with a gas mixture of CO and $NH_3$. Because the etch mask used in the present embodiment is an Au nano-particle film, it has a higher dry etch resistance than the conventional resist mask and it wears less during etching. Thus, it is possible to transfer the mask pattern onto the magnetic layer accurately by RIE. In the present embodiment, a region 18 covered with the Au nano-particle 38 was not etched, while a region 19 with no nano-particles was cut by the etch gas. In this way, a good micropattern with the pattern diameter d of 20 nm and pattern interval s of 10 nm was formed on the magnetic layer 1 on the substrate, as shown in FIG. 10D.

The substrate was evaluated in terms of magnetic characteristics, using a vibrating sample magnetometer. As a result, a magnetization curve that exhibited good magnetization characteristics was obtained, where the out-of-plane coercivity was 200 kA/m (2500 Oe), the coercive squareness S* was 0.75, and the residual magnetization was 100 emu/cc. In this way, a patterned perpendicular magnetic recording medium with good magnetic characteristics was successfully prepared using the above-described pattern forming method.

The patterned perpendicular magnetic recording medium prepared in the present embodiment was then provided with a protection film consisting mainly of carbon and a coating of fluorinated lubricant, thereby preparing a patterned recording medium for evaluation. Using this medium in combination with a thin-film single-pole head for perpendicular magnetic recording, as a write head, and a head with separate read/write elements comprising a GMR element, as a read head, a magnetic disk unit as shown schematically in FIG. 14 was assembled. The magnetic disk unit comprises a magnetic disk 45 as a recording medium, a motor 44 for driving the magnetic disk 45, a magnetic head 46 on which a write head and a read head are mounted, a suspension 47 holding the magnetic head 46, an actuator 48 and a voice coil motor 49 involved with the driving and positioning of the magnetic head, a read/write circuit 50, and a positioning circuit 51. The unit is connected to a host via an interface control circuit 52. Using this magnetic disk unit, the output of the read head was examined. As a result, an output of approximately 1 mV peek to peek was obtained when the recording density was 100 kfci. It was also learned that its wear resistance was comparable to that of the conventional sputtering-deposited media.

Embodiment 2

An Au nano-particle single-layered film was formed on the entire surface of the magnetic layer by Langmuir-Blodgett (LB) process, instead of the spin coating process used Embodiment 1. In the present embodiment too, a solution of colloidal Au nano-particles with the diameter of 20 nm coated with dodecanethiol with the length of 4 nm was used.

In the following, a process of forming a nano-particle film by the LB process is described. The LB film is formed by adding the colloidal solution of metal nano-particles dropwise to clear water surface in a trough, thereby forming a single-layered film of nano-particles on the water surface. A movable barrier is then moved to slowly and gently compress the single-layered film floating on the water surface. Specifically, after washing the bottom, edges, and the movable barrier plate of the trough (water tank) of an LB film manufacturing apparatus with acetone, the trough was filled with ion-exchange water. The level of the water bulging due to surface tension was then adjusted to be uniform and low, or approximately 0.5 mm from the edge of the trough. Then, a surface pressure meter and the movable barrier plate were set at predetermined positions. The colloidal solution of nano-particles in a micro syringe was then delivered dropwise at different locations on the water surface in a quiet manner, thereby causing the nano-particles to be spread on the water surface. The concentration of the Au colloidal solution that was delivered dropwise was approximately 1 μmol/L, and the solution was spread at the volume of approximately 1000 μL per 600 $cm^2$ of spread area. After the nano-particles were thus spread on the water surface, the water was allowed to stand for 30 min until the spread solvent was completely evaporated. Thereafter, the movable barrier plate was moved at the compression rate of 7.2 $cm^2$ per min, thereby compressing the nano-particle single-layered film formed on the water surface while monitoring the surface pressure. When the surface pressure reached 10 to 20 mN/m, the compression was terminated, whereupon an Au nano-particle single-layered film with a closely packed and substantially regular arrangement was obtained. By repeating this process several times, it is also possible to obtain a multilayered LB film in which the nano-particle single-layered films are layered. The Au nano-particle single-layered film formed by the LB process was then printed on a glass or Si substrate, whose surface had been rendered hydrophobic, by horizontal lifting method. The surface of the substrate was rendered hydrophobic using iron (III) stearate or epoxidized butadiene. The Au nano-particle single-layered film printed on the substrate was allowed to stand in a clean bench, thereby letting it dry naturally.

Using the Au nano-particle single-layered film thus formed by the LB process as described above as a mask, the magnetic layer was subjected to anisotropic dry etching in the same manner as in Embodiment 1 with a gas mixture of CO and $NH_3$. As a result, a good micropattern was formed on the entire surface of the magnetic layer 1, as in the example of FIG. 10D, the pattern having a pattern diameter d of 20 nm and pattern interval s of 10 nm.

As in Embodiment 1, the substrate with the micropattern formed thereon by the above-described method was examined for magnetic characteristics, using the vibrating sample magnetometer. As a result, a magnetization curve with good magnetic characteristics was obtained, exhibiting an out-of-plane coercivity of 200 kA/m (2500 Oe), coercive squareness S* of 0.75, and residual magnetization of 100 emu/cc. Thus, a patterned perpendicular magnetic recording medium with good magnetic characteristics was prepared by the above-described pattern forming method.

Figure 14:
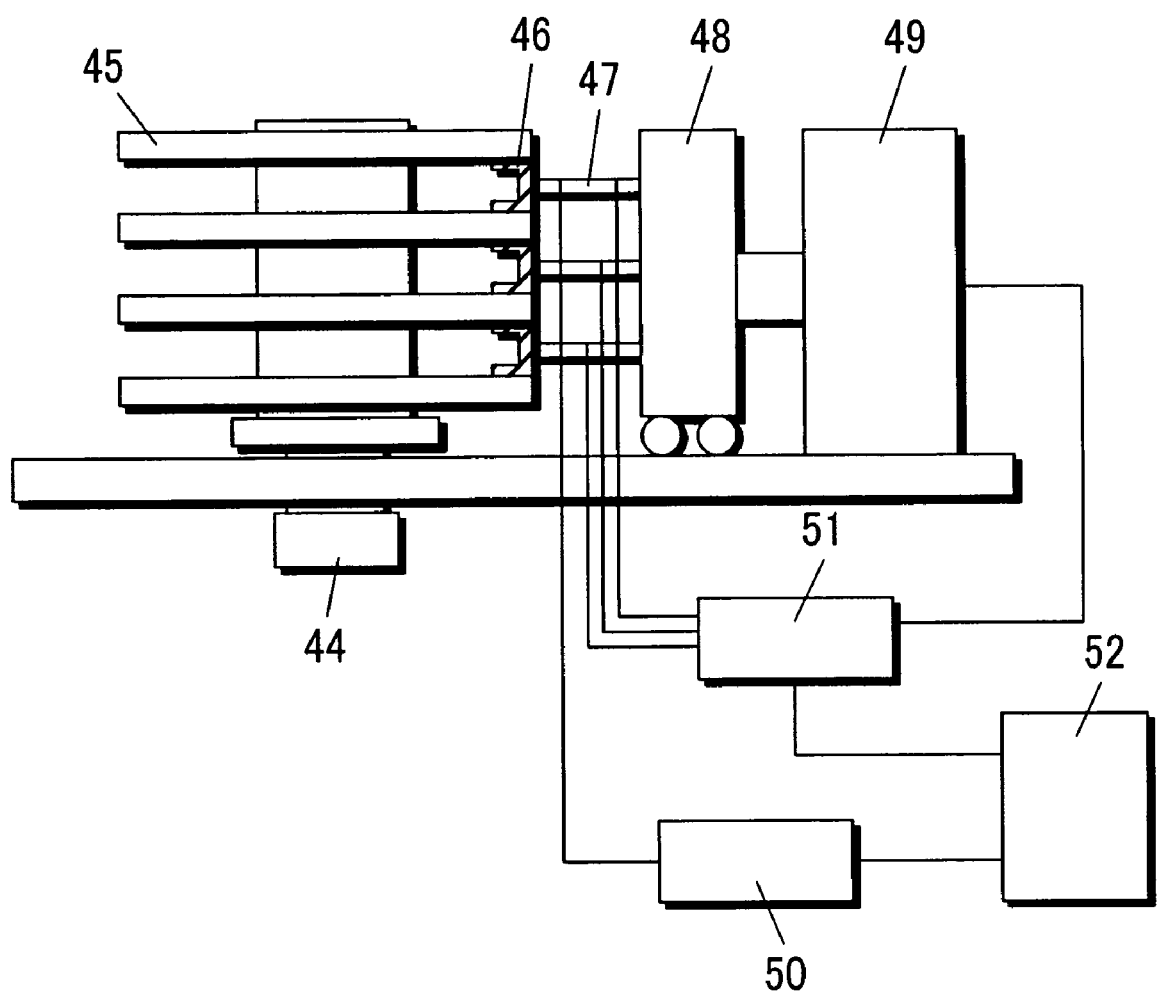
FIG. 14 schematically shows a magnetic disk unit according to the present invention.

The patterned perpendicular magnetic recording medium thus prepared in the present embodiment was then provided with a protection film and a fluorinated lubricant coating, as in Embodiment 1, thereby preparing a patterned perpendicular recording medium for evaluation. Using this medium in combination with a thin-film single-pole head for perpendicular magnetic recording and a head with separate read/write elements comprising a GMR element, a magnetic disk unit was assembled as shown in FIG. 14, and the output of the unit was examined. As a result, an output of approximately 1 mV peek to peek was obtained when the recording density was 100 kfci. It was also learned that its wear resistance was comparable to that of the conventional sputtering-deposited media.

Embodiment 3

In Embodiments 1 and 2, the nano-particle film was formed on the entire surface of the magnetic layer. In Embodiment 3, an example is described in which the nano-particle film is partially formed on the magnetic layer. The soft magnetic layer, intermediate layer, and magnetic layer applied to the substrate were the same as those of Embodiments 1 and 2.

FIG. 11 shows a process for preparing the partial nano-particle film using a mold. Initially, a process of preparing a pattern transfer mold is described with reference to FIGS. 11A to 11D. Referring to FIG. 11A, a latent image of a desired micropattern is formed in a resist layer 28 formed on a molding substrate (such as that of SiN) 27, using EB lithography or optical lithography 29. The resist layer is then developed as shown in FIG. 11B, thereby exposing a micropattern 30 on the substrate of SiN or the like. The micropattern may be a concentric line-and-space pattern or it may be a lattice-shaped pattern such that concentric lines intersect with lines radially extending from the center of the substrate. Thereafter, as shown in FIG. 11C, using the resist pattern as a mask, the SiN substrate is dry-etched with fluorine gas 31. The resist is then removed as shown in FIG. 11D, thereby forming a desired concave-convex pattern 32 on the SiN substrate. The thus obtained SiN substrate is used as the pattern mold 33.

Figure 11A:
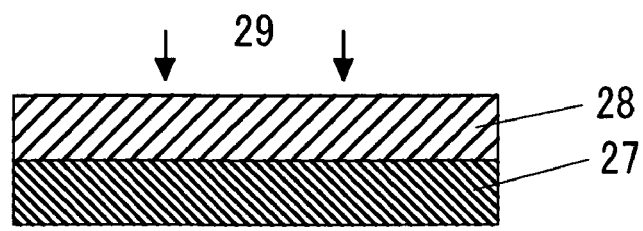
FIGS. 11A to 11G show a process for forming a nano-particle film using a mold.
Figure 11B:
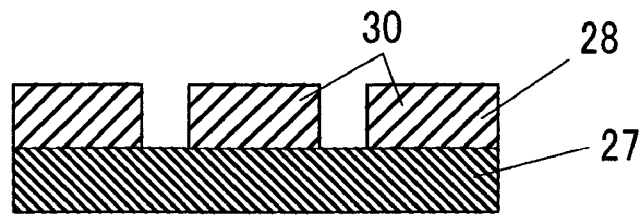
Figure 11C:
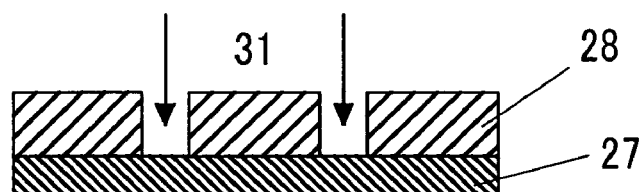
Figure 11D:
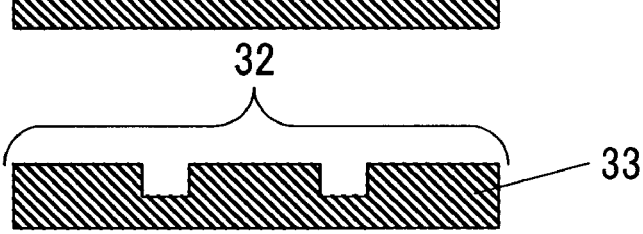
Figure 11E:
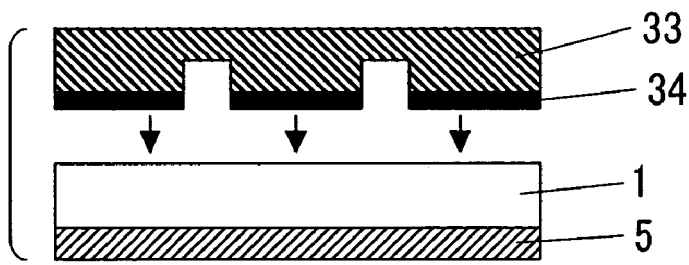
Figure 11F:
Figure 11G:
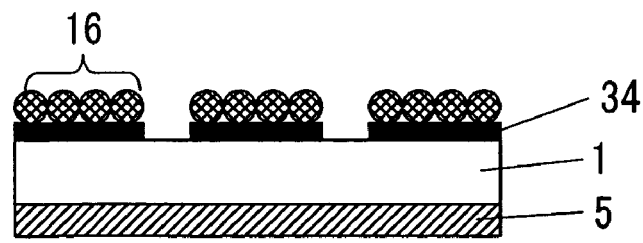

Hereafter, a process for forming a nano-particle film on the magnetic layer is described. As shown in FIG. 11E, a compound 34 capable of causing the nano-particles to be bonded to the magnetic layer is distributed in the convex portions of the mold 33, and then the surfaces of the mold and the magnetic layer 1 are closely put together, thereby transferring the adhesive compound 34 onto the surface of the magnetic layer 1, as shown in FIG. 11F. Thereafter, the solution of nano-particles is applied to the surface of the magnetic layer by spin coating, or the substrate with the magnetic layer is immersed in the solution of nano-particles and then lifted. As a result, the nano-particles are bonded only to those regions with adhesive components 34 on the magnetic layer, resulting in a desired nano-particle film 16 as shown in FIG. 11G. Although this method involves the transfer of pattern using a mold, as in the imprint method disclosed in Non-Patent Documents 1 and 2, it does so by transferring an adhesive compound onto the magnetic layer without using a resist. Thus, the method does not involve the transfer of a resist onto the mold, so that an accurate pattern transfer can be performed.

An actual discrete-track medium was prepared by a process shown in FIG. 12, using the above-described mold. Referring to FIG. 12A, the adhesive compound 34 is distributed on the convex portions of the mold 33 prepared from the SiN substrate, and the surfaces of the mold and the magnetic layer were then closely put together, thereby transferring the adhesive compound onto the surface of the magnetic layer 1, as shown in FIG. 12B. The adhesive compound used was a silane compound. Because the mold had a concentric line-and-space pattern formed thereon in this example, a concentric adhesive pattern was accurately transferred onto the CoCrPt magnetic layer surface after the adhering process. The line-and-space pattern thus transferred had dimensions such that the width of the line was 300 nm and that of the space was 100 nm.

Figure 12A:
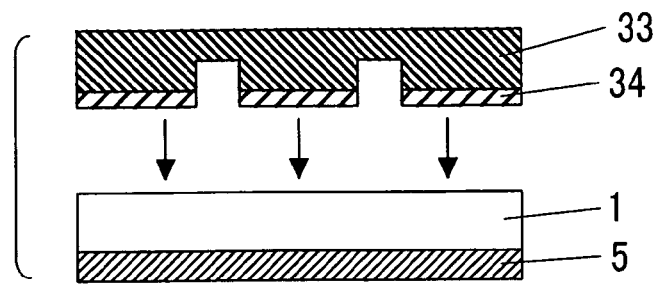
FIGS. 12A to 12F show Embodiments 3, 4, and 6.
Figure 12B:
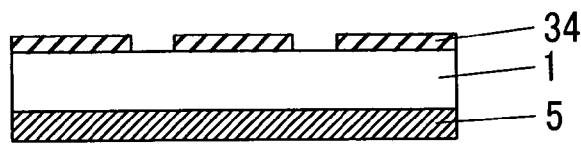
Figure 12C:
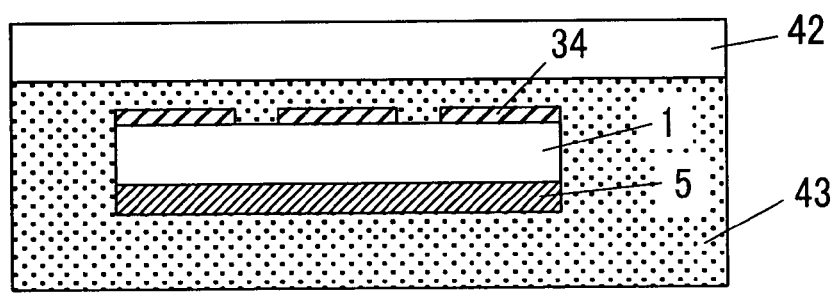
Figure 12D:
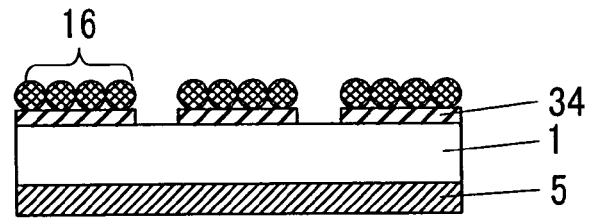

Next, as shown in FIG. 12C, the substrate was immersed in a solution 43 of the Au nano-particles contained in a water tank 42 and then lifted. As a result, as shown in FIG. 12D, the nano-particles adhered to only the regions 34 with adhesive on the magnetic layer. When the entire substrate was viewed, the nano-particle film had a structure such that, as shown in FIG. 7B, portions 25 with the nano-particles and portions 26 without the nano-particles are alternately formed on the magnetic layer 21 in a concentric manner. In this example, the Au nano-particles used were spherical in shape with the diameter of 3 nm, and the ligand was decanethiol with carbon number of 10. The Au nano-particles of the present embodiment had a relatively small diameter of 3 nm, so that the portions 16 where the multitudes of Au nano-particles are bonded function as the mask during the cutting process.

Figure 12E:
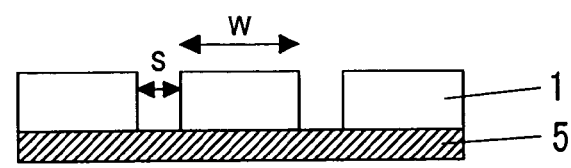

Using this nano-particle film 16 as a mask, the magnetic layer 1 was subjected to anisotropic dry etching with a gas mixture of CO and $NH_3$. As a result, as shown in FIG. 12E, a good discrete track pattern was formed on the magnetic layer of the substrate, having a pattern cross-sectional with w of 290 nm and a track interval s of 110 nm.

As in Embodiment 1, the substrate with the micropattern formed thereon by the above-described method was examined for magnetic characteristics, using the vibrating sample magnetometer. As a result, a magnetization curve with good magnetic characteristics was obtained, exhibiting an out-of-plane coercivity of 200 kA/m (2500 Oe), coercive squareness S* of 0.75, and residual magnetization of 100 emu/cc. Thus, a discrete-track perpendicular magnetic recording medium with good magnetic characteristics was prepared by the above-described pattern forming method.

The discrete-track perpendicular magnetic recording medium thus prepared in the present embodiment was then provided with a protection film and a fluorinated lubricant coating, as in Embodiments 1 and 2, thereby preparing a patterned perpendicular recording medium for evaluation. Using this medium in combination with a thin-film single-pole head for perpendicular magnetic recording and a head with separate read/write elements comprising a GMR element, a magnetic disk unit was assembled as shown in FIG. 14, and the output of the unit was examined. As a result, an output of approximately 1 mV peek to peek was obtained when the recording density was 100 kfci. It was also learned that its wear resistance was comparable to that of the conventional sputtering-deposited media.

Embodiment 4

Instead of the mold used in Embodiment 3, a lattice-shaped adhesive pattern was transferred onto the CoCrPt magnetic layer using a mold with a lattice-shaped pattern such that concentric lines intersect with lines radially extending from the center of the substrate. The substrate was then immersed in a solution of nano-particles and then lifted, in the same manner as in Embodiment 3, thereby causing the nano-particles to be bonded only to those regions of the magnetic layer where the adhesive existed. The Au nano-particle solution used in this example was the same as that used in Embodiment 3. When the entire substrate was viewed, the nano-particle film had a structure such that, as shown in FIG. 7C, portions 25 with the nano-particles were formed on the magnetic layer 21 in a lattice.

Figure 12F:
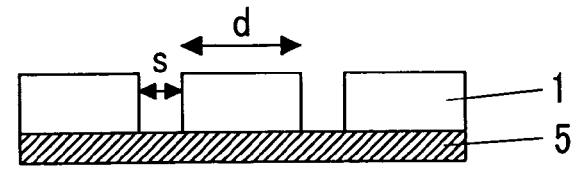
Figure 13A:
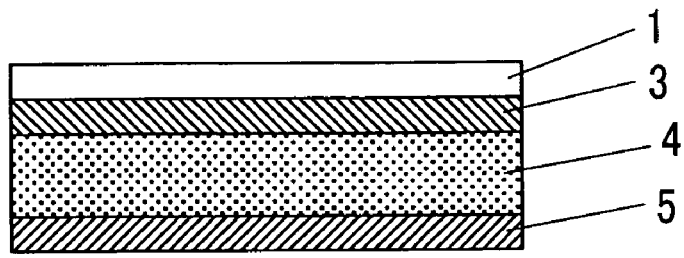
FIGS. 13A to 13D show Embodiment 5.
Figure 13B:
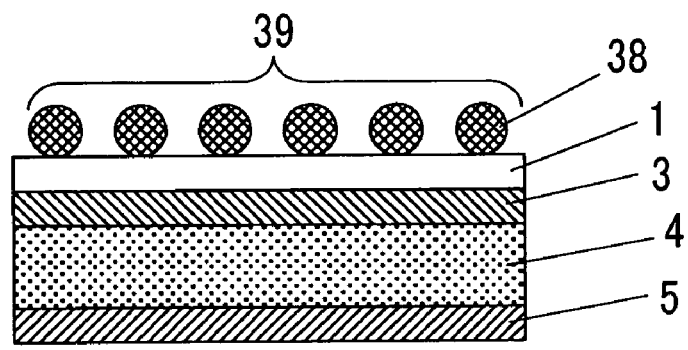
Figure 13C:
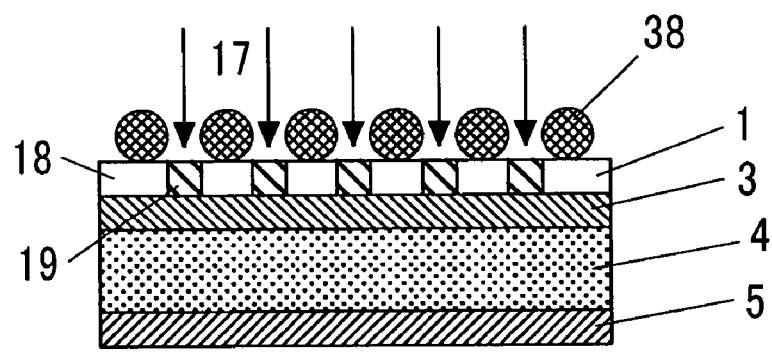
Figure 13D:
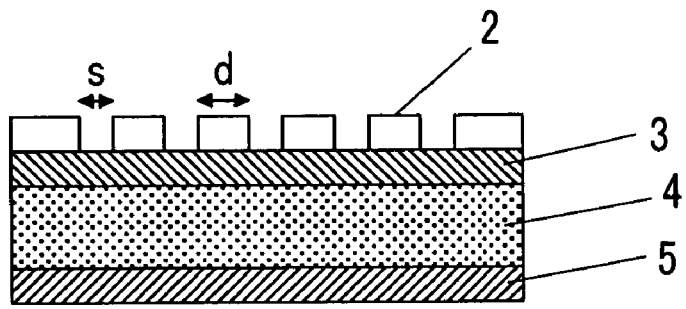

Using this nano-particle film as a mask, the magnetic layer was subjected to anisotropic dry etching with a gas mixture of CO and $NH_3$. As a result, as shown in FIG. 12F, a good micropattern was formed on the magnetic layer on the substrate that had a pattern diameter d of 200 nm and a pattern interval s of 50 nm.

Embodiment 5

A micropattern was prepared on the magnetic layer by a process shown in FIG. 13 to obtain a multilayered film of Co and Pd (to be hereafter referred to as a Co/Pd multilayer) as a magnetic layer for optically assisted magnetic recording. As shown in FIG. 13A, in a first step, a soft magnetic layer 4 mainly consisting of Co, an intermediate layer 3 mainly consisting of Ru and Ta, and a magnetic layer (Co/Pd multilayer) 1 for perpendicular magnetic recording were formed in such order on the substrate 5. In a second step, as shown in FIG. 13B, an Au nano-particle film 39 was formed on the entire surface of the magnetic layer 1. The nano-particles used were spherical Au particles with the diameter of 20 nm, as in Embodiment 1. In a third step, as shown in FIG. 13C, using the Au nano-particle layer as a mask, the Co/Pd multilayered film was subjected to RIE with a gas mixture of CO and $NH_3$, as indicated by numeral 17. Regions 18 covered with the Au nano-particles 38 were not etched, while regions 19 without the nano-particles were cut by the gas. As a result, as shown in FIG. 13D, a good micropattern 2 was formed in the Co/Pd multilayer that had a pattern diameter d of 20 nm and a pattern interval s of 20 nm.

Embodiment 6

Instead of the Au nano-particles with the diameter of 20 nm in Embodiment 5, a Pt nano-particle coated with oleic acid and oleyl amine having a diameter of 3 nm was used. The recording film was formed by the Co/Pd multilayered film, as in Embodiment 5. Because the diameter of the nano-particles is small at 3 nm, a micropattern was prepared by the process shown in FIG. 12.

Using a mold with a lattice pattern such that concentric lines intersect with lines radially extending from the center of the substrate, a lattice-shaped adhesive pattern was transferred onto the magnetic layer consisting of the Co/Pd multilayered film (FIG. 12B), as in Embodiment 4. Then, the substrate was immersed in a hexane solution of the Pt nano-particles and then lifted, thereby causing the Pt nano-particles to be bonded only to those regions where the adhesive 34 existed, as shown in FIG. 12D. As a result, as shown in FIG. 7C, a nano-particle film was formed on the magnetic layer 21 in which portions 25 with the nano-particles were arranged in a lattice.

Using this nano-particle film as a mask, the magnetic layer consisting of the Co/Pd multilayer was subjected to anisotropic dry etching with a Cl gas. As a result, as shown in FIG. 12F, a good micropattern was formed in the magnetic layer on the substrate that had a pattern diameter d of 200 nm and a pattern interval s of 50 nm.

The substrate was evaluated in terms of magnetic characteristics, using a vibrating sample magnetometer. As a result, a magnetization curve that exhibited good magnetization characteristics was obtained, where the out-of-plane coercivity was 100 kA/m (1250 Oe), the coercive squareness S was 0.65, and the residual magnetization was 150 emu/cc. In this way, a patterned perpendicular magnetic recording medium with good magnetic characteristics was successfully prepared using the above-described pattern forming method.

The patterned perpendicular magnetic recording medium thus prepared in the present embodiment was then provided with a protection film consisting mainly of carbon, and with a fluorinated lubricant coating, thereby preparing a patterned perpendicular recording medium for evaluation. Using this medium in combination with an optically assisted magnetic recording head that optically heats only the recorded regions for recording, and a GMR element as a read head, a read/write experiment was conducted. As a result, an output of approximately 1 mV peek to peek was obtained when the recording density was 100 kfci. It was also learned that the wear resistance of the medium was comparable to that of the conventional sputtering-deposited media.

What is claimed is:

1. A method for producing a recording medium, comprising the steps of:
    forming a magnetic layer on a substrate;
    forming a nano-particle film on a desired portion of said magnetic layer;
    cutting said magnetic layer using said nano-particle film as a mask; and
    forming a pattern in said magnetic layer by removing said nano-particle film, wherein said nano-particle film is formed by forming an adhesive layer on said desired portion of said magnetic layer, and causing nano-particles to be bonded to said adhesive layer,
    wherein said adhesive layer is formed by applying an adhesive to a mold, and transferring said adhesive to said magnetic layer.

2. The method for producing a recording medium according to claim 1, wherein said magnetic layer is a recording layer comprising at least one of elements Fe, Co, Ni, Mn, Sm, Pt, Pd, and Cr, and wherein said nano-particle film is a film formed by nano-particles comprising at least one of elements Au, Pt, and Pd.

3. The method for producing a recording medium according to claim 1, wherein said nano-particle film formed at a desired portion of said magnetic layer is a nano-particle film formed by disposing nano-particles on the entire surface of said magnetic layer.

4. The method for producing a recording medium according to claim 1, wherein said nano-particle film formed on a desired portion of said magnetic layer is a nano-particle film with a structure such that a portion where the nano-particles exist and a portion where the nano-particles do not exist are alternately formed in a concentric manner on said magnetic layer.

5. The method for producing a recording medium according to claim 1, wherein said nano-particle film formed on a desired portion of said magnetic layer is a nano-particle film such that a portion where the nano-particles exist is disposed at a lattice point on said magnetic layer.

6. The method for producing a recording medium according to claim 1, wherein said nano-particle film comprises a single layer of a substantially regular arrangement of nano-particles that are substantially spherical in shape, said nano-particles having a diameter range of 1 nm or greater and 100 nm or less and a grain size distribution of 10% or less.

7. The method for producing a recording medium according to claim 6, wherein the nano-particles forming said nano-particle film are substantially spherical in shape, wherein the diameter of a convex portion, which is substantially cylindrical in shape, of a fine concave-convex pattern formed on said magnetic layer is substantially the same as the diameter of the nano-particles.

8. The method for producing a recording medium according to claim 4, wherein said nano-particle film comprises multiple layers of substantially regularly arranged nano-particles that are substantially spherical in shape and that have a diameter range of 1 nm or greater and 100 nm or less, said nano-particles having a grain size distribution of 10% or less.

9. The method for producing a recording medium according to claim 5, wherein said nano-particle film comprises multiple layers of substantially regularly arranged nano-particles that are substantially spherical in shape and that have a diameter range of 1 nm or greater and 100 nm or less, said nano-particles having a grain size distribution of 10% or less.

10. The method for producing a recording medium according to claim 1, wherein said cutting step comprises the use of a focused ion beam.

11. The method for producing a recording medium according to claim 1, wherein said cutting step comprises RIE.

12. The method for producing a recording medium according to claim 1, wherein said magnetic layer formed on said substrate is a recording layer comprising at least one of elements Fe, Co, Ni, Pt, Pd, and Cr, and wherein said nano-particle film formed on a desired portion of said magnetic layer comprises nano-particles containing at least one of elements Au, Pt, and Pd, said step of cutting said magnetic layer using said nano-particle film as a mask comprises RIE using a gas comprising at least one of elements chlorine, carbon, hydrogen, oxygen, and nitrogen.

13. The method for producing a recording medium according to claim 1, wherein said adhesive layer is formed in a concentric manner on said magnetic layer.

14. The method for producing a recording medium according to claim 1, wherein said adhesive is a silane compound.

* * * * *